United States Patent
Holness

(10) Patent No.: US 10,652,024 B2
(45) Date of Patent: May 12, 2020

(54) DIGITAL SIGNATURE SYSTEMS AND METHODS FOR NETWORK PATH TRACE

(71) Applicant: Ciena Corporation, Hanover, MD (US)

(72) Inventor: Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 238 days.

(21) Appl. No.: 15/479,342

(22) Filed: Apr. 5, 2017

(65) Prior Publication Data

US 2018/0294969 A1  Oct. 11, 2018

(51) Int. Cl.
  *H04L 9/32* (2006.01)
  *H04L 12/26* (2006.01)
  *H04L 29/06* (2006.01)
  *G06F 11/10* (2006.01)
  *H04L 12/70* (2013.01)
  *H04L 12/24* (2006.01)

(52) U.S. Cl.
  CPC ........ *H04L 9/3247* (2013.01); *G06F 11/1004* (2013.01); *H04L 9/32* (2013.01); *H04L 43/0847* (2013.01); *H04L 43/10* (2013.01); *H04L 63/061* (2013.01); *H04L 69/22* (2013.01); *H04L 41/085* (2013.01); *H04L 2012/5626* (2013.01)

(58) Field of Classification Search
  USPC ............... 726/2, 21, 36; 713/150, 163, 171; 380/255, 264, 276
  See application file for complete search history.

(56) References Cited

U.S. PATENT DOCUMENTS

| | | | | |
|---|---|---|---|---|
| 9,025,435 | B2 * | 5/2015 | Holness | H04L 12/437 370/216 |
| 9,979,601 | B2 * | 5/2018 | Filsfils | H04L 41/12 |
| 2005/0068890 | A1 * | 3/2005 | Ellis | H04L 41/5009 370/229 |

(Continued)

FOREIGN PATENT DOCUMENTS

EP  2405608 A1  11/2012

OTHER PUBLICATIONS

Philip Koopman et al., Carnegie Mellon University Research Showcase @ CMU, Institute for Software Research, School of Computer Science, Cyclic Redundancy Code (CRC) Polynomial Selection for Embedded Networks, 2004, pp. 1-11.

(Continued)

*Primary Examiner* — Sharif E Ullah
(74) *Attorney, Agent, or Firm* — Clements Bernard Walker Law; Christopher L. Bernard; Lawrence A. Baratta, Jr.

(57) ABSTRACT

Digital signature systems and methods to represent network path trace information in a packet, implemented by a network element in a network include updating a digital signature based on a unique identifier of the network element, wherein the digital signature is carried in-band with the packet; and transmitting the packet by the network element with the updated digital signature, wherein the digital signature represents the network path trace information of the packet up to the network element. The digital signature is a key carried in-band with the packet, and the updating can include performing an exclusive OR function with a current key and a Cyclic Redundancy Check (CRC) of a bit field with the unique identifier included therein to derive a new key which is inserted as the digital signature in the packet.

14 Claims, 10 Drawing Sheets

(56) References Cited

U.S. PATENT DOCUMENTS

| | | | | |
|---|---|---|---|---|
| 2005/0099949 A1* | 5/2005 | Mohan | ................... | H04L 47/10 370/236.2 |
| 2005/0099951 A1* | 5/2005 | Mohan | ................ | H04L 43/0811 370/241 |
| 2005/0099952 A1* | 5/2005 | Mohan | ................... | H04L 41/04 370/241 |
| 2005/0099954 A1* | 5/2005 | Mohan | ................... | H04L 41/12 370/241.1 |
| 2005/0099955 A1* | 5/2005 | Mohan | ................ | H04L 43/0811 370/242 |
| 2006/0031482 A1* | 2/2006 | Mohan | ................ | H04L 12/4641 709/224 |
| 2007/0260552 A1* | 11/2007 | Bennett | ............... | H04L 63/0245 705/59 |
| 2010/0135291 A1* | 6/2010 | Martin | ................... | H04L 45/00 370/389 |
| 2010/0165883 A1* | 7/2010 | Holness | .................. | H04L 45/28 370/255 |
| 2011/0016316 A1* | 1/2011 | Amir | ....................... | H04L 63/12 713/168 |
| 2013/0329565 A1* | 12/2013 | Holness | .............. | H04L 43/0811 370/241.1 |
| 2013/0332602 A1* | 12/2013 | Nakil | ................... | H04L 41/147 709/224 |
| 2016/0315819 A1* | 10/2016 | Dara | ........................ | H04L 69/22 |
| 2016/0378580 A1* | 12/2016 | Ries | ........................ | G06F 11/07 714/819 |

OTHER PUBLICATIONS

P. Quinn et al., Service Function Chaining, Internet-Draft, Intended status: Standards Track, Network Service Header draft-ieff-sfc-nsh-11.txt, Feb. 12, 2017, pp. 1-37.

J. Halpern et al., Internet Engineering Task Force (IETF), Category: Informational, ISSN: 2070-1721, Service Function Chaining (SFC) Architecture, Oct. 2015, pp. 1-32.

Sep. 18, 2018, International Search Report and Written Opinion issued for International Application No. PCT/US2018/023951.

Frank Brockners et al., Cisco Live!, Service Chain Verification, DevNet-1084, XP009191657, Feb. 15-19, 2016, Germany, pp. 1-60.

* cited by examiner

US 10,652,024 B2

DIGITAL SIGNATURE SYSTEMS AND METHODS FOR NETWORK PATH TRACE

FIELD OF THE DISCLOSURE

The present disclosure generally relates to networking systems and methods. More particularly, the present disclosure relates to digital signature systems and methods for network path trace.

BACKGROUND OF THE DISCLOSURE

Network path trace denotes a route a packet or other piece of data takes in a network between two network nodes. Conventional techniques used on the data path to capture network path trace information fall into two general categories. First, through the insertion of synthetic Operations, Administration, and Maintenance (OAM) Protocol Data Units (PDUs) into the network (e.g., LinkTrace, Internet Protocol (IP) TraceRoute, Multiprotocol Label Switching (MPLS) TraceRoute) and then each hop within the path responds back with intermediate hop device information. Techniques of this type are inferences since they do not actually capture the exact network trace path of the data packets being transported through the network. Second, through the insertion of intermediate hope device identification information in a header of the packet (e.g., IPv6 extension header in-band OAM). In essence, a linked list of device identification information is included in the header. As a consequence, the header gets undeterministically large and introduces processing performance restrictions. Disadvantageously, the first technique is only inferences of the actual network path (since they inject synthetic test PDUs into the data path to capture the network path, i.e., the data is not associated with each packet, but a test packet). The second technique results in an undeterministic explosion of the packet header since the device identifiers within the chain are essentially stored in the header of the packet.

BRIEF SUMMARY OF THE DISCLOSURE

In an exemplary embodiment, a digital signature method to represent network path trace information in a packet, implemented by a network element in a network, includes updating a digital signature based on a unique identifier of the network element, wherein the digital signature is carried in-band with the packet; and transmitting the packet by the network element with the updated digital signature, wherein the digital signature represents the network path trace information of the packet up to the network element. The digital signature can be a key carried in-band with the packet, and the updating can include performing an exclusive OR function with a current key and a Cyclic Redundancy Check (CRC) of a bit field with the unique identifier included therein to derive a new key which is inserted as the digital signature in the packet. The updated digital signature can be a fixed size and carried in overhead of the packet. A network controller can be configured to query the network element for the digital signature to verify a network path for the packet. The digital signature method can further include, prior to the updating, receiving the unique identifier from a network controller, wherein the unique identifier is resolved to be within a range of M, M being a longest interconnection sequence of network elements in the network. The packet can include a Network Service Header (NSH) and the digital signature is carried in a Context Header therein. The packet can include an Internet Protocol (IP) packet and the digital signature is carried in one of an Options field and a Next Header extensions field. The packet can include an Operations, Administration, and Maintenance (OAM) Protocol Data Unit (PDU) which is processed hop-by-hop in a bridged network.

In another exemplary embodiment, a digital signature apparatus is configured to represent network path trace information in a packet, wherein the digital signature apparatus is within a network element in a network. The digital signature apparatus includes circuitry configured to update a digital signature based on a unique identifier of the network element, wherein the digital signature is carried in-band with the packet; and circuitry configured to transmit the packet with the updated digital signature, wherein the digital signature represents the network path trace information of the packet up to the network element. The digital signature can be a key carried in-band with the packet, and the circuitry configured to update can be configured to perform an exclusive OR function with a current key and a Cyclic Redundancy Check (CRC) of a bit field with the unique identifier included therein to derive a new key which is inserted as the digital signature in the packet. The updated digital signature can be a fixed size and carried in overhead of the packet. A network controller can be configured to query the network element for the digital signature to verify a network path for the packet. The digital signature apparatus can further include circuitry configured to receive the unique identifier from a network controller prior to the circuitry configured to update the digital signature performing an update, wherein the unique identifier is resolved to be within a range of M, M being a longest interconnection sequence of network elements in the network. The packet can include a Network Service Header (NSH) and the digital signature is carried in a Context Header therein. The packet can include an Internet Protocol (IP) packet and the digital signature is carried in one of an Options field and a Next Header extensions field. The packet can include an Operations, Administration, and Maintenance (OAM) Protocol Data Unit (PDU) which is processed hop-by-hop in a bridged network.

In a further exemplary embodiment, a network element configured to represent network path trace information in a packet includes at least one port configured to transmit the packet; and a controller associated with or communicatively coupled to the at least one port, wherein the controller is configured to update a digital signature based on a unique identifier of the network element, wherein the digital signature is carried in-band with the packet, and cause transmission of the packet with the updated digital signature, wherein the digital signature represents the network path trace information of the packet up to the network element. The digital signature can be a key carried in-band with the packet, and the controller can be further configured to perform an exclusive OR function with a current key and a Cyclic Redundancy Check (CRC) of a bit field with the unique identifier included therein to derive a new key which is inserted as the digital signature in the packet. A network controller can be configured to query the network element for the digital signature to verify a network path for the packet. The controller can be further configured to receive the unique identifier from a network controller prior to the circuitry configured to update the digital signature performing an update, wherein the unique identifier is resolved to be within a range of M, M being a longest interconnection sequence of network elements in the network.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
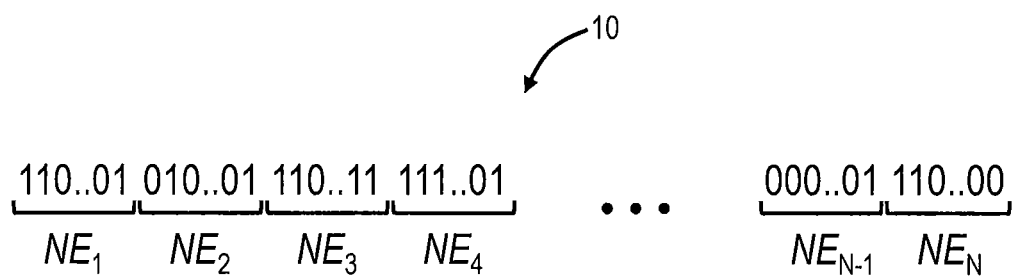
FIG. 1 is a diagram of a sequence representation of N network elements in binary form.

Again, in various exemplary embodiments, the present disclosure relates to digital signature systems and methods for network path trace. The systems and methods use a minimal and fixed size digital signature that is carried in the packet to represent the network path experienced by a packet/frame being transported through a network. Although not specific to virtualize network environments, where service function chains (i.e., the network path) can be dynamic in nature, the systems and methods allow a network operator (or data center administrator) to confirm/verify/prove that the actual packet path is what is expected. The systems and methods define a minimal fixed size information element (i.e., digital signature) that can be used to represent all permutations of a network path (i.e., the sequence of network elements encountered by a forwarded packet through the network) experienced by a packet through a network. The systems and methods gather network path trace information on a per packet, hop-by-hop basis, via in-band techniques (in-band refers to the fact the network path trace information is carried with the packet such as in overhead).

The network path trace information can be used to verify and confirm the actual path of travel of packets through a network (which is increasingly becoming more and more dynamic in the advent of Virtualized Network Functions (VNFs)). In operation, the systems and methods include utilization of n-bit (e.g., 48 or 64) polynomials used by a Cyclic Redundancy Check (CRC) function to represent network path traces including virtual and physical network functions. The systems and methods can extend the newly adopted IETF NSH (Network Service Header) protocol and header definition (which is the Service Function Chain (SFC) encapsulation required to support the SFC architecture) to convey digital signature information that represents network path trace information. The systems and methods can also extend to IPv4 and IPv6 header information to convey digital signature information that represents network path trace information.

The digital signature is compact and efficient in size, overcoming the limitations described herein with the second technique where there is an undeterministic explosion of the packet header. The foregoing describes techniques to identify (and/or validate) the path (i.e., the sequential interconnection of a network element) that a packet takes through the network, using the digital signature. The problem of network flow path/trace identification is a common problem, in traditional networks, and is an increasingly larger and more difficult problem in a virtualized network where service functions can dynamically be instantiated and removed within a service chain. In addition, in the presence of the chaining of virtual and physical service/network functions supporting the service, identifying the exact path of travel of a packet within a network is non-trivial. The technique outlined in herein is not contingent upon the introduction of synthetic [test] data into the data stream to infer the actual path of travel. Instead, the technique outlined herein includes a minimal fixed size information element (i.e., a digital signature) that can be carried by client packets being transported through the network. This digital signature can be encoded to represent large (e.g., 100s of thousands or greater) chain of devices that represent a path. This digital signature can also be in an OAM PDU dispatch within the network.

From a mathematical perspective, the problem can be stated as follows: Given a set (A), which contains a sequence (S) of elements, where the maximum number of elements is M, but the maximum number of elements within a sequence within the set (A) is N (where N≥1), find a representation of S that is fixed in size and that requires minimal space. Again, the minimal space is required such that the packet header does not become undeterministically large, rendering this approach difficult.

FIG. 1 is a diagram illustrating a sequence representation 10 of N network elements in binary form. Here, the sequence representation 10 represents uniquely each of the N network elements and can be used to denote a network path trace through the N network elements. The sequence representation 10 is a brute force technique to solve the problem stated above—define S such that S is simply a concatenation of the maximum number of elements in the sequence. As a consequence, the size of S (in bits) could be represented by Equation (1) as follows:

$$\text{Size}(S) = N \times \log_2 M \qquad \text{Equation (1): Maximum path size}$$

When applied to a network, assume ~100K network elements that could be connected, and further assume that the maximum sequence would be ~256. Then the resulting Size(S) would be $256 \times \log_2 10^5 \approx 4,252$) approximately ~530 bytes. Including this size information element within a packet in transit is not practical nor feasible.

A second approach could be to itemize the various permutations of network element sequences that could occur within the network. This size of the maximum permutations would then reflect the size of the data. Here, S is simply an index into a table of permutations of network element connections. The size of S (in bits) could be represented by Equation (2) as follows:

Permutations Path Size  Equation (2)

$$P\binom{M}{1} + P\binom{M}{2} + \ldots + P\binom{M}{N} = \sum_{k=1}^{N} P\binom{M}{k}$$

$$\text{Size}(S) = \log_2 \sum_{k=1}^{N} P\binom{M}{k}$$

$$\text{Size}(S) = \log_2 \sum_{k=1}^{N} \frac{M!}{(M-k)!}$$

$$\text{Size}(S) = \log_2 \left( M! \times \sum_{k=1}^{N} \frac{1}{(M-k)!} \right)$$

$$\text{Size}(S) = \log_2 M! + \log_2 \sum_{k=1}^{N} \frac{1}{(M-k)!}$$

$$\text{Size}(S) = \sum_{k=1}^{M} \log_2 k + \log_2 \sum_{k=1}^{N} \frac{1}{(M-k)!}$$

$$\text{Size}(S) = \sum_{k=1}^{N} \log_2 k - \log_2 \sum_{k=1}^{N} (M-k)!$$

The resulting size of S is still [extremely] large, and really is not a practical nor feasible technique to convey the network element path.

For a networking application, a network with M network elements with a worse case interconnection sequence of N could have a set (A) of sequences (S), where S represents the network path experienced by a packet being transported through said network. However, the set A would be sparse (and not dense). Consequently, a hashing function could be used to represent the set A, where the sequences (S) within set A could be represented by a data structure that is much less than outline within Technique 1 and 2.

Figure 2:
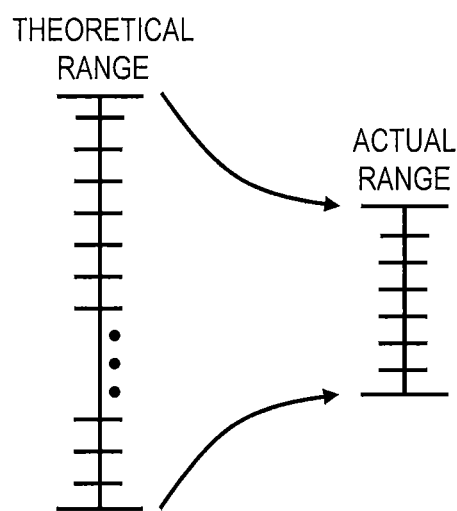
FIG. 2 is a diagram of the hashing reduction which takes a theoretical range and condensing to a smaller range.

FIG. 2 is a diagram illustrating the hashing reduction which takes a theoretical range and condensing to a smaller range. An n-bit binary CRC computation is proposed to determine the hash key. A property of the CRC function is that it is linear. This is illustrated by Equation 1. The digital signature scheme described within will exploit this property.

CRC($X \oplus Y \oplus Z$)=CRC($X$)$\oplus$
CRC($Y$)$\oplus$CRC($Z$)  Equation 1: CRC Linear Function CRC(Z)

where $\oplus$ represents an Exclusive OR function

Each packet is assumed to contain an n-bit key (which is computed by the CRC function). The n-bit key can be instantiated within a packet.

Figure 3:
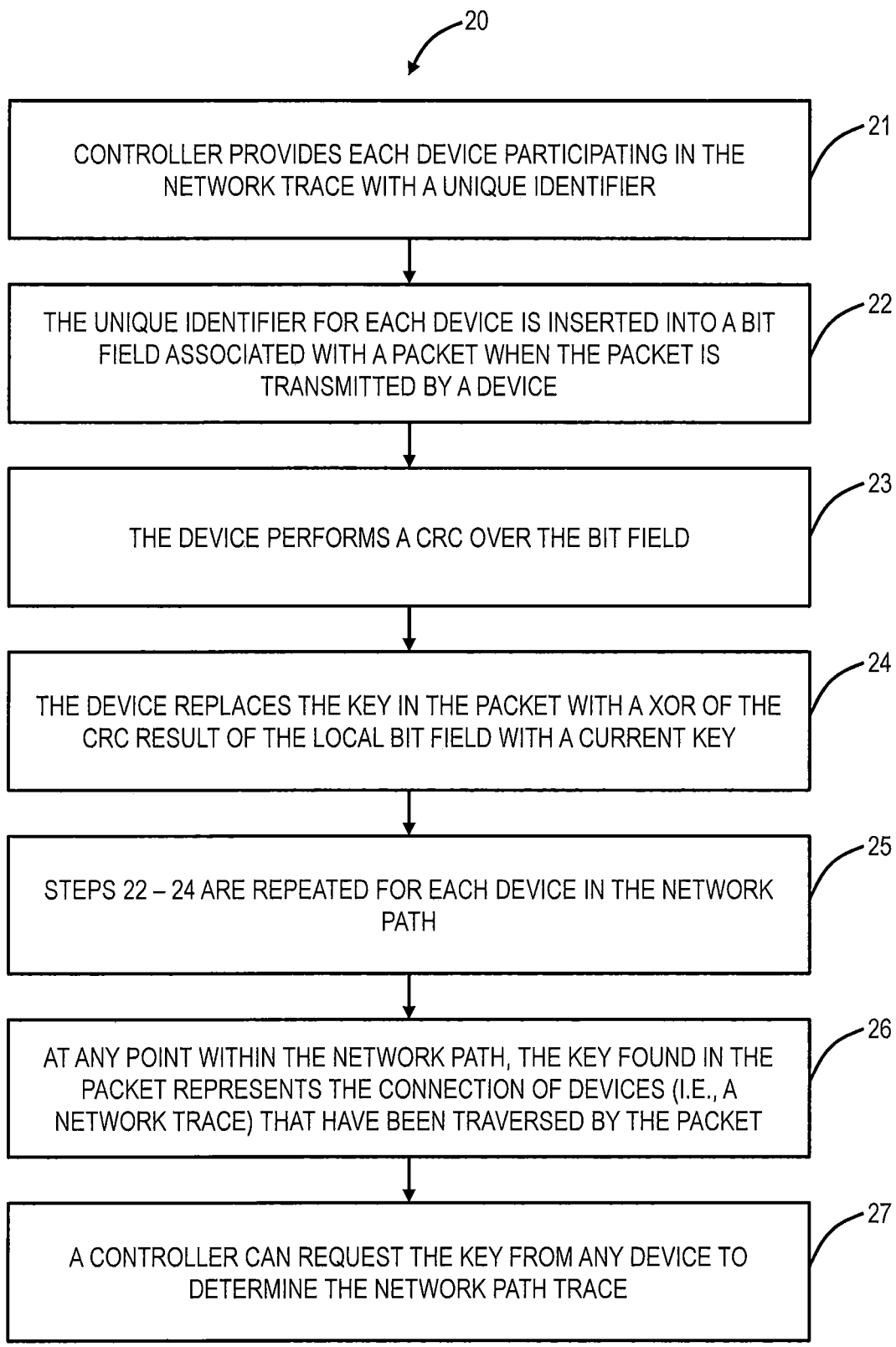
FIG. 3 is a flowchart of a process using the digital signature for network path trace representation for a packet.
Figure 4:
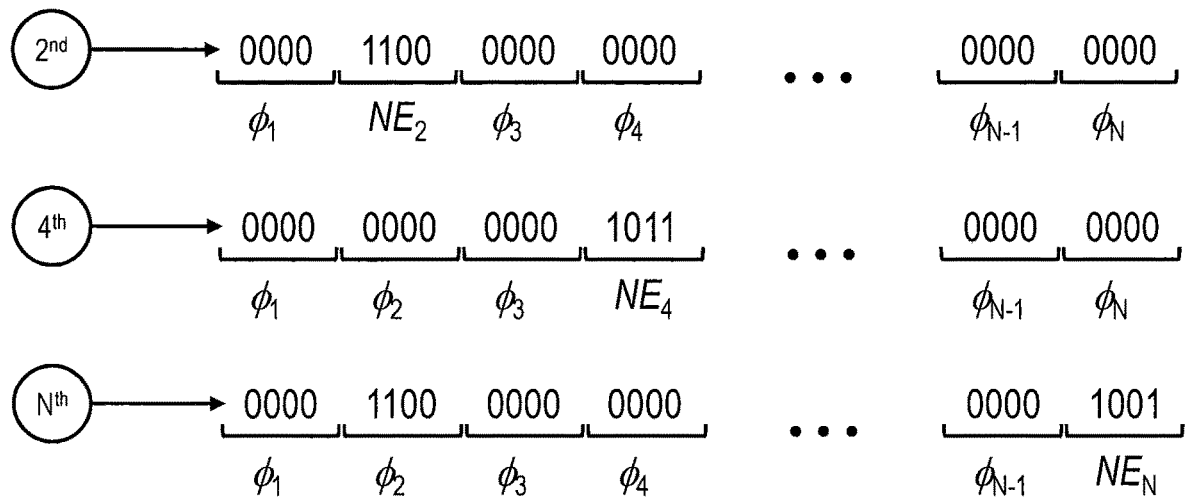
FIG. 4 is a diagram of device identifier insertion for the process of FIG. 3.

FIG. 3 is a flowchart of a process 20 using the digital signature for network path trace representation for a packet. The process 20 includes a controller providing each device (network element, node, VNF, etc.) participating in the network trace with a unique identifier (step 21). This identifier can be resolved to be within the range of M (M being a number of network elements in the network). Each packet transmitted in the network requiring or supporting the inclusion of the network path trace information includes a key field which is manipulated at each device for the network path trace information. When a packet requires transmission by a device, it will take the unique identifier and insert it into a bit field that is representative of the (theoretical maximum) path size (step 22). FIG. 4 is a diagram of device identifier insertion. The placement location of the identifier within the bit field is derived from hop count information found within the packet. As illustrated in FIG. 4, a device that is second in the chain will insert its identifier in the second location of the path bit stream. All other bits in the bit field are zeroed out. Similarly, for a device that is fourth in the chain will insert its identifier in the fourth location, and the Nth device will insert its identifier in the Nth location; all other bits in the bit field are zeroed out. Note, this bit field is rather large (within the range of M) and impractical to transport in the packet. Rather, the packet includes the key which is manipulated at each device based on CRC functions on the bit field.

Figure 5:
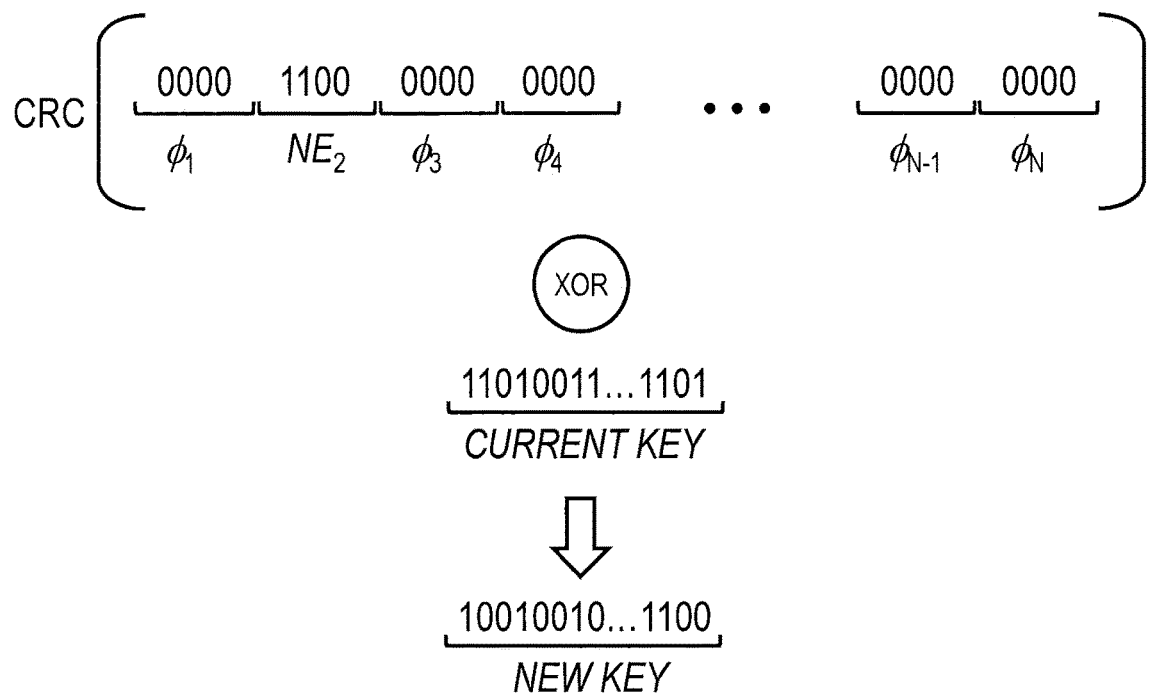
FIG. 5 is a diagram of the computation of a new key for the process of FIG. 3.

Back in FIG. 3, after the unique identifier is inserted at a specific device, the device performs a CRC over the bit field (step 23). The device replaces the key in the packet with an Exclusive OR (XOR) of the CRC result from step 23 with a current key. FIG. 5 illustrates a diagram of the computation of a new key. For example, as illustrated in FIG. 5, the second device in the path will create the path bit stream with its identifier in the bit stream location specified by the second slot. It will apply the CRC, then XOR the result with the current supplied key (from the packet). The new key will then be embedded in the packet header.

Figure 6:
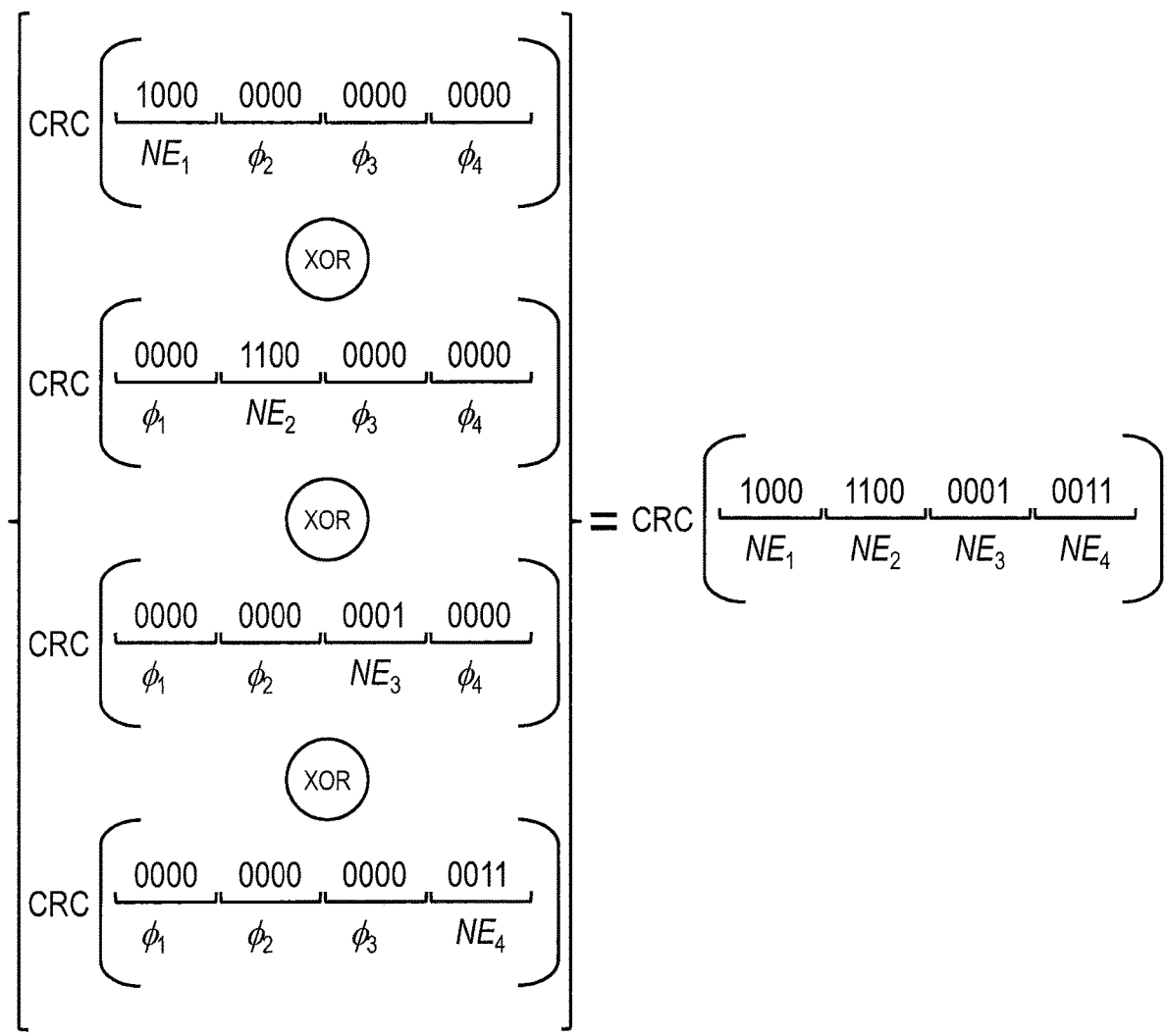
FIG. 6 is a diagram with illustrates key linearity of a Cyclic Redundancy Check (CRC) for the process of FIG. 3.

Back in FIG. 3, steps 22-24 are repeated for each device in the network path (step 25). The linear function behavior of the CRC (as illustrated in Equation 1) is exploited and is shown in FIG. 6 which illustrates key linearity of the CRC. Back in FIG. 3, at any point within the network path, the key found in the packet represents the connection of devices (i.e., a network trace) that have been traversed by the packet (step 26). A controller can request the key from any device to determine the network path trace (step 27).

Figure 7:
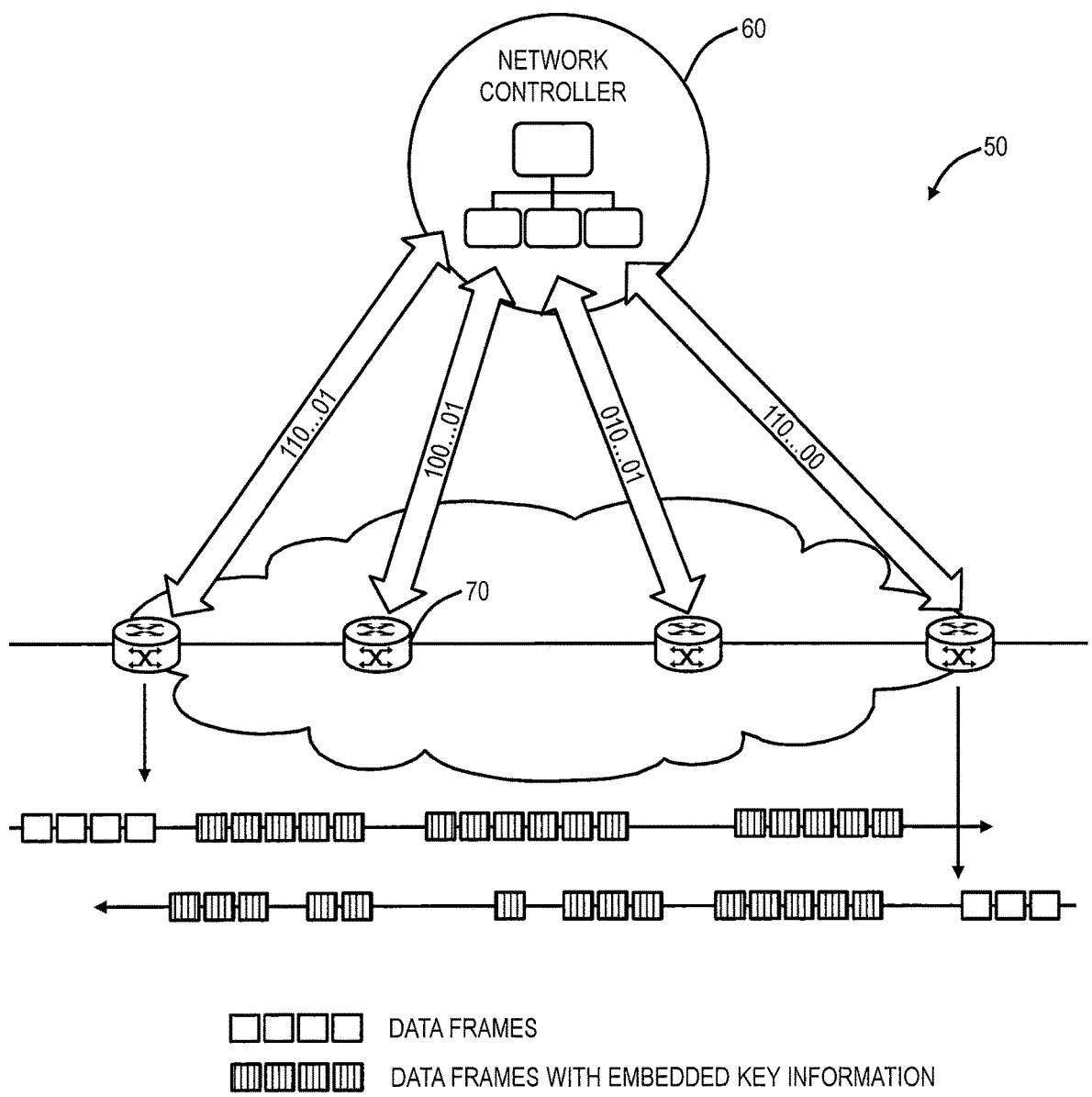
FIG. 7 is a network diagram of a network with a network controller communicatively coupled to network elements for performing the process of FIG. 3.

FIG. 7 illustrates a network diagram of a network 50 with a network controller 60 communicatively coupled to network elements 70. The network elements 70 and the network controller 60 can be configured to implement the process 20. Specifically, the network elements 70 can perform steps 22-26 in the process 20 while the network controller 60 can perform steps 21 and 26-27. The key in each packet is an encoded representation of the network trace of the packet. The network controller 60 can use the key found in the packet to (a) confirm the network path used by this given flow is what is expected, or (b) determine the network path experienced by this particular flow. In a virtual environment (e.g., within a data center or a distributed Network Functions Virtualization Infrastructure (NFVI) application), the chain (i.e., network trace) can be dynamic and can change periodically. Determining/confirming the actual network trace of the chain is critical for these reasons.

The length of the CRC (i.e., n-bit CRC), used over the bit stream being checked, is a factor in minimizing key collisions. For this networking application, assume that a network with 100s of thousands of network elements, with a maximum hop count of 255. As described herein and Equation (1), the size of the bit stream would be ~530 to 638 bytes. Additionally, the Hamming Distance (HD), which is the minimum possible number of bit inversions that must be injected into a message to create an error that is undetectable by the CRC computed over the bit stream, is another important factor. The recommended polynomial (see Koopman et al., "Cyclic Redundancy Code (CRC) Polynomial Selection for Embedded Networks," presented at The International Conference on Dependable Systems and Networks, DSN-2004, the contents of which are incorporated by reference) used by the CRC function should take the aforementioned factors into consideration. Based thereon, for the networking application a 32-bit to 64-bit CRC is recommended. The resulting polynomial, with coefficients that are elements of the finite field GS(2) (Galois Field of two elements (e.g., 0,1)), is also critical.

Based on work from Philip Koopman, Carnegie Mellon University (users.ece.cmu.edu/~koopman/crc/), a CRC-32 polynomial could be 0xE89061DB (Koopman notation), while a CRC-64 polynomial could be 0xA17870F5D4F51B49 (Koopman notation). The CRC-64 polynomial is represented by Equation 2 below.

CRC-64 Polynomial                                      Equation 2

$0xA17870F5D4F51B49 =$ $x^{64} + x^{62} + x^{57} + x^{55} + x^{54} + x^{53} + x^{52} + x^{47} +$ $x^{46} + x^{45} + x^{40} + x^{39} + x^{38} + x^{37} + x^{35} + x^{33} +$ $x^{32} + x^{31} + x^{29} + x^{27} + x^{24} + x^{23} + x^{22} + x^{21} +$ $x^{19} + x^{17} + x^{13} + x^{12} + x^{10} + x^{9} + x^{7} + x^{4} + x^{1} + 1$

Note, the polynomial used by the CRC function to derive the digital signature can periodically be changed by the network controller 60 to increase security and further minimize key collisions.

This network trace methodology can be supported by any network transport technology that allows packets/frames to include a digital signature information element that can be examined and recomputed at each forwarding/routing hop within the network. In addition, each packet needs to contain hop count information (e.g., Time to Live (TTL) or hop count).

Figure 8:
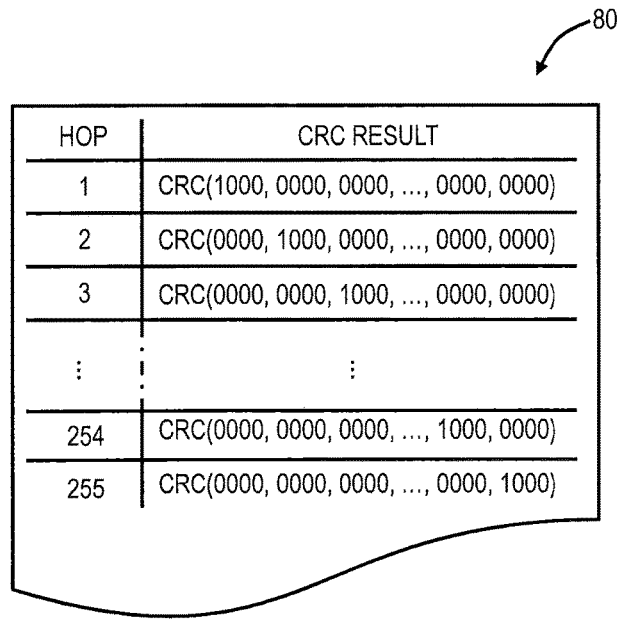
FIG. 8 is a diagram of a bit stream CRC table for the process of FIG. 3.

At each hop, as illustrated in FIG. 5, the digital signature will be re-computed. An implementation option, to be considered to improve network element throughput performance, is for the network controller 60 to supply each device the CRC key associated with each bit stream with the device position inserted. As illustrated in FIG. 8, the network controller 60 can supply each network element 70 with the CRC value of the bit stream corresponding to the position of the device in the path. FIG. 8 is a diagram of a bit stream CRC table 80.

Figure 9:
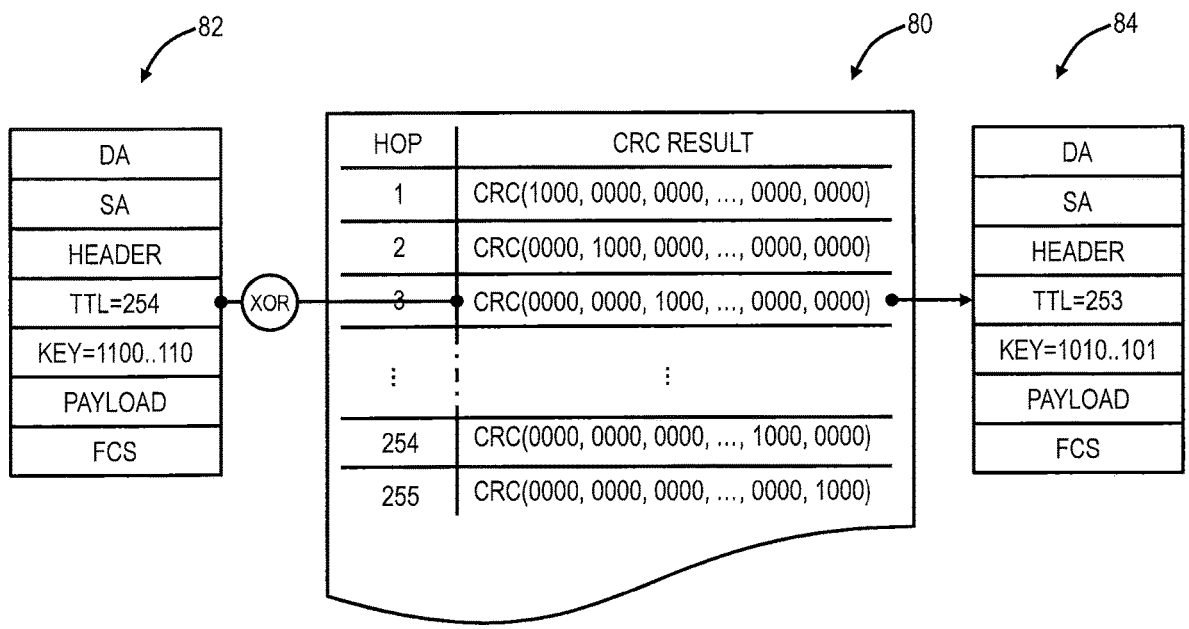
FIG. 9 is a diagram of an optimized CRC key re-computation.

The digital signature (i.e., key) re-computation, as illustrated in FIG. 5, can now be simplified, as illustrated in FIG. 9. FIG. 9 is a diagram of an optimized CRC key re-computation. Specifically, FIG. 9 illustrates an input header 82 received by a third network element 70, the CRC table 80, and an output header 84. The headers 82, 84 include a Destination Address (DA), a Source Address (SA), a header, a TTL field (set to 254 for the input header 82 and to 253 for the output header 84), the key, payload, and a Frame Check Sequence (FCS). The input header 82 includes a current key (1100 . . . 110) which reflects the network path trace information up to the third network element. This current key (1100 . . . 110) is XOR with the CRC result for the unique identifier of the third network element in the CRC table 80. The result of the XOR is input into the output header 84 as the new key (1010 . . . 101).

Figure 10:
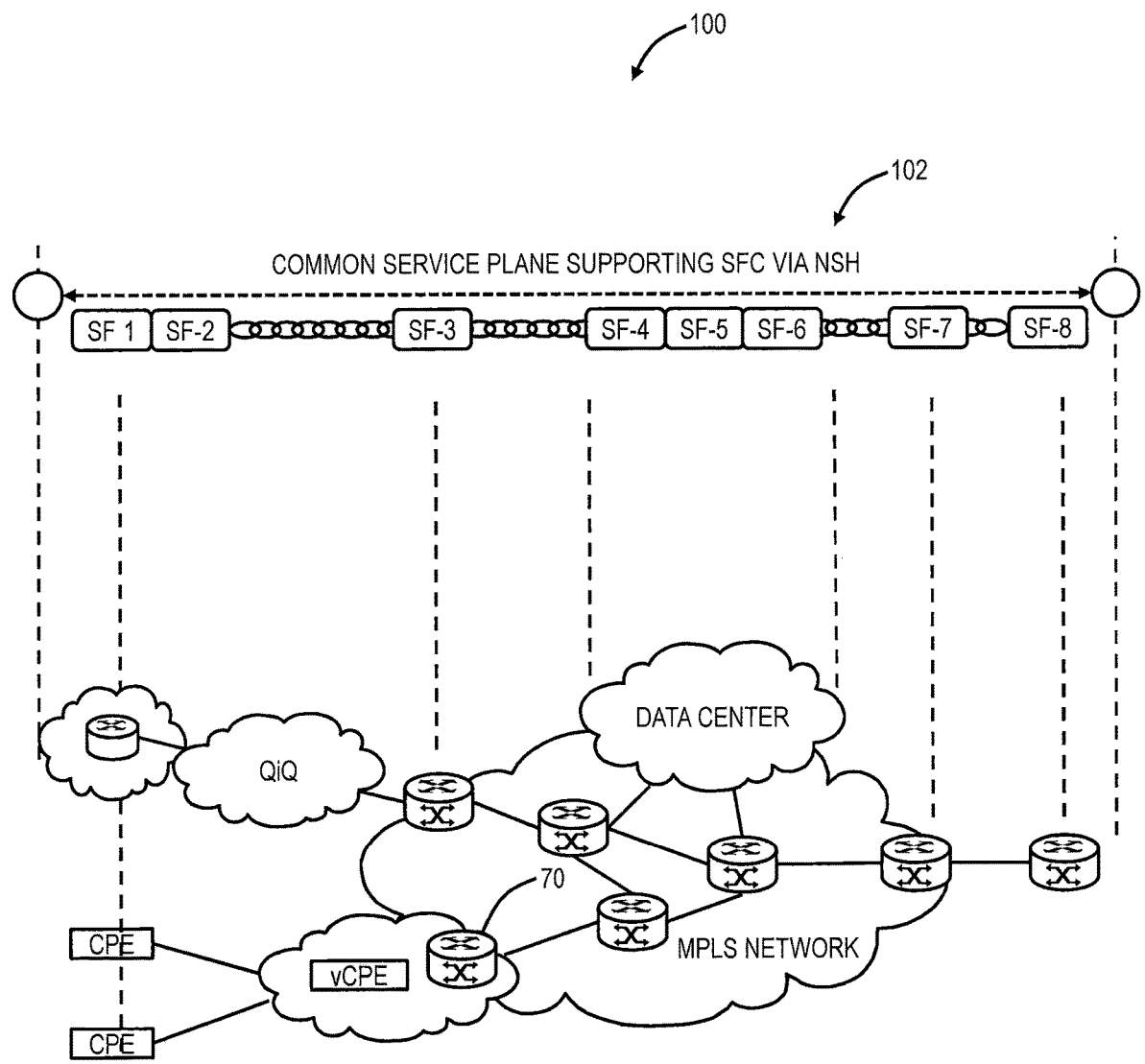
FIG. 10 is a network diagram of a network with a common service plane via Network Service Header (NSH)

FIG. 10 is a network diagram of a network 100 with a common service plane 102 via Network Service Header (NSH). The network 100 includes various network elements 70 shown distributed as virtualized Customer Premises Equipment (vCPE), CPE, Provider Edges (PE), virtualized PE (vPE), MPLS network elements, data center, etc., all operating with the common service plane 102 that supports Service Function Chain (SFC) via NSH. NSH is described in IETF draft draft-ietf-sfc-nsh-10.txt entitled "Network Service Header," (Sep. 20, 2016), the contents of which are incorporated by reference. NSH is a data-plane header/protocol that represents a service path in the network. It decouples the service layer from the network transport (as illustrated in FIG. 10). NSH is the SFC (Service Function Chain) encapsulation required to support the SFC architecture (as defined in RFC 7665 "Service Function Chaining (SFC) Architecture," (October 2015), the contents of which are incorporated by reference).

Figure 11:
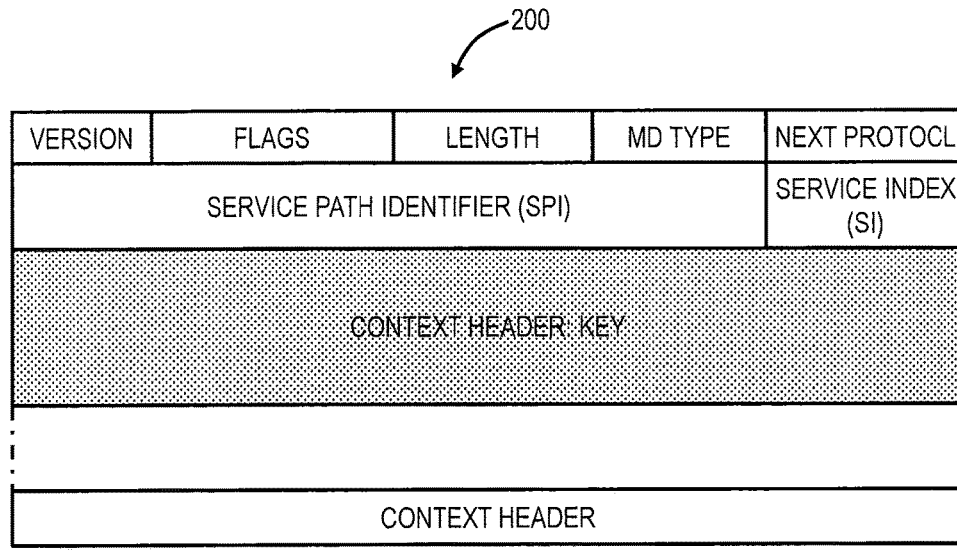
FIG. 11 is a block diagram of a Network Service Header (NSH)

Each and every packet forwarded through the service chain will have an NSH. FIG. 11 is a block diagram of a Network Service Header (NSH) 200. The NSH 200 includes a version field, flags, a total length, a Metadata (MD) Type which defines the format of the metadata being carried, and a Next Protocol which indicates the protocol type of encapsulated data. A Service Path Identifier (SPI) identifies a service path and a Service Index (SI) providing a location within the Service Function Path (SFP). The SI (Service Index), which is an existing field in the NSH 200, provides the location within the SFP (service function path). This is like a TTL. The MD (metadata) Type field indicates the format of the Context Header. For this application, a new MD Type and a new Context Header are defined which contains the key (or digital signature) for the packet being transported. At each SF (service function) within the chain, the key (i.e., digital signature) will be recomputed, as illustrated in FIG. 9.

Figure 12:
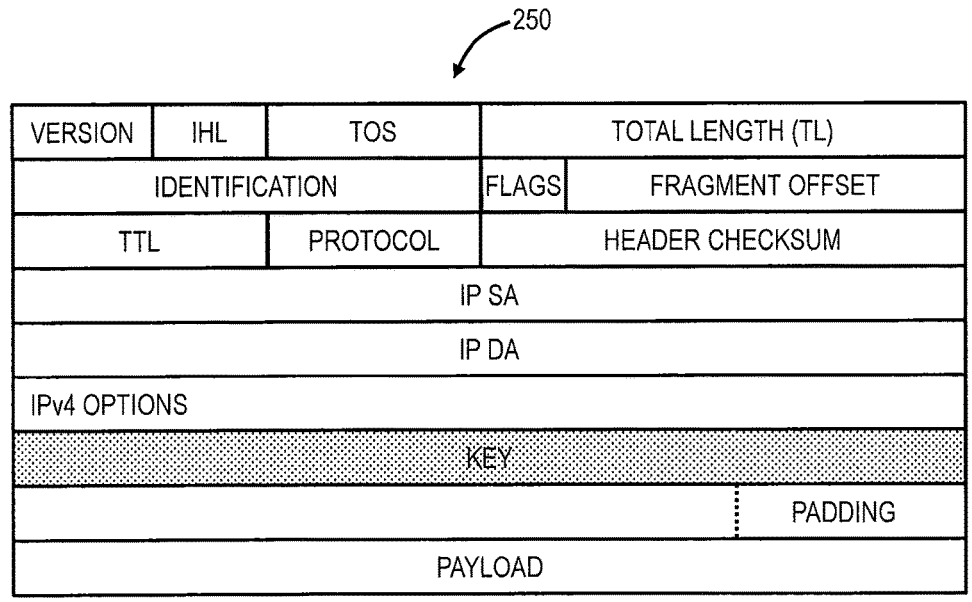
FIG. 12 is a block diagram of an IP header (IPv4)

FIG. 12 is a block diagram of an IP header 250 (IPv4). Within an IP network, the IP header 250 can be used to carry the digital signature of the network path trace. For example, in the case of IPv4 (illustrated in FIG. 12), the key or digital signature can be carried in the Options field. The hop count information is carried in the TTL field.

Figure 13:
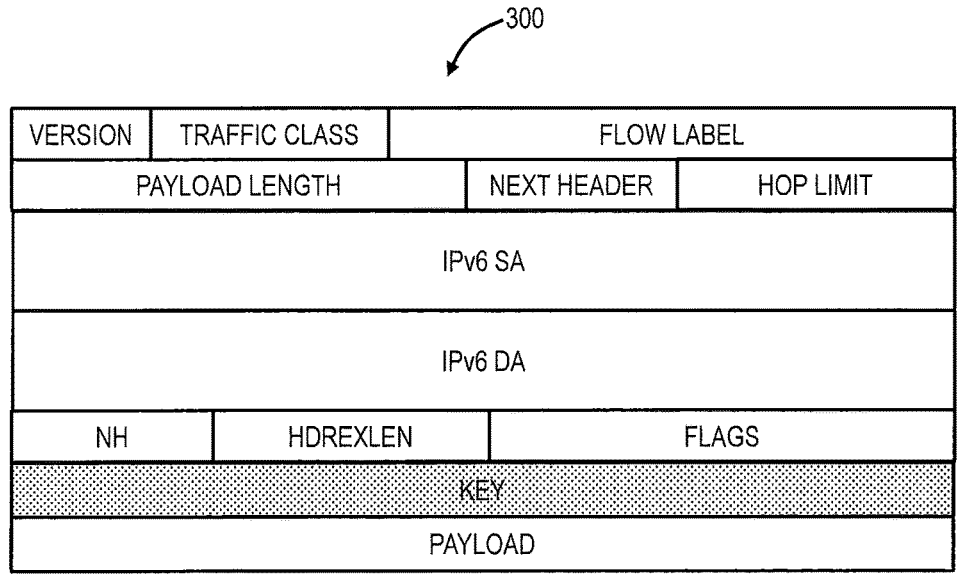
FIG. 13 is a block diagram of an IP header (IPv6)

FIG. 13 is a block diagram of an IP header 300 (IPv6). In the event of an IPv6 network (illustrated in FIG. 13), the Hop Limit field conveys the hop count, while the Next Header extensions can be used to carry the key (or digital signature) associated with the network path.

Figure 14:
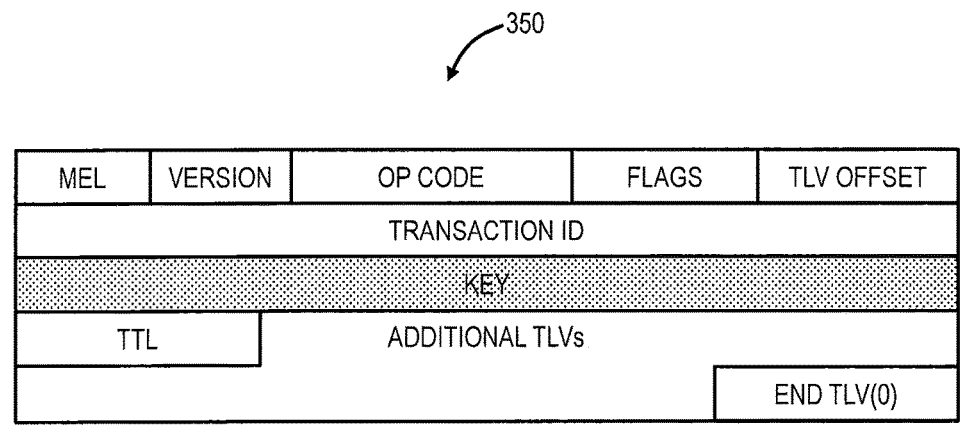
FIG. 14 is a block diagram of a network trace OAM PDU.

FIG. 14 is a block diagram of a network trace OAM PDU 350. A Bridged (Ethernet) Network does not process the frame in transit on a hop-by-hop basis (e.g., as is the case within an IP network). Data frames that are forwarded (at transit points) do not modify the frame. Consequently, to adapt this digital signature scheme to a Bridged Network, an OAM PDU could be used, such that the OAM PDU is defined to be processed hop-by-hop through the network.

This [new] OAM protocol could abide by IEEE 802.1ag (and ITU-T Y.1731) Connectivity Fault Management (CFM) network architectural rules. The format of the OAM PDU 350 is illustrated in FIG. 14. Both the key (i.e., digital signature) and hop count (via the TTL) are encoded in the PDU body. This OAM protocol requires hop-by-hop processing. At each hop, the key is re-computed, as illustrated in FIG. 9.

Exemplary Packet Switching Node

Figure 15:
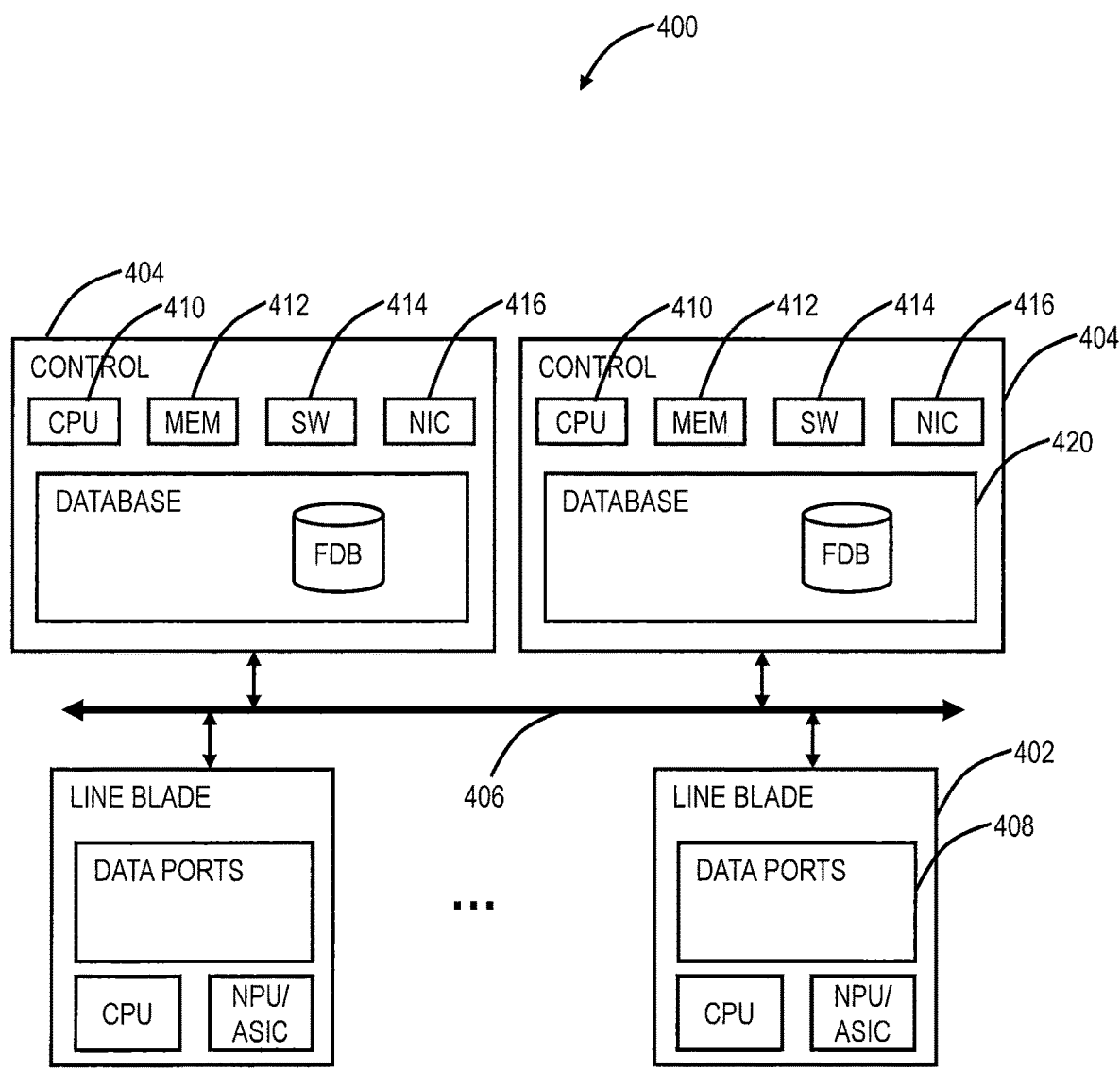
FIG. 15 a block diagram of an exemplary implementation of a network element for the implementation of the systems and methods described herein.

Referring to FIG. 15, in an exemplary embodiment, a block diagram illustrates an exemplary implementation of a network element 400 for implementation of the systems and methods described herein. In this exemplary embodiment, the network element 400 is an Ethernet, MPLS, IP, etc. network switch, but those of ordinary skill in the art will recognize the systems and methods described herein can operate with other types of network elements and other implementations. In this exemplary embodiment, the network element 400 includes a plurality of blades 402, 404 interconnected via an interface 406. The blades 402, 404 are also known as line cards, line modules, circuit packs, pluggable modules, etc. and generally refer to components mounted on a chassis, shelf, etc. of a data switching device, i.e., the network element 400. Each of the blades 402, 404 can include numerous electronic devices and optical devices mounted on a circuit board along with various interconnects including interfaces to the chassis, shelf, etc.

Two exemplary blades are illustrated with line blades 402 and control blades 404. The line blades 402 include data ports 408 such as a plurality of Ethernet ports. For example, the line blade 402 can include a plurality of physical ports disposed on an exterior of the blade 402 for receiving ingress/egress connections. Additionally, the line blades 402 can include switching components to form a switching fabric via the interface 406 between all of the data ports 408 allowing data traffic to be switched between the data ports 408 on the various line blades 402. The switching fabric is a combination of hardware, software, firmware, etc. that moves data coming into the network element 400 out by the correct port 408 to the next network element 400. "Switching fabric" includes switching units, or individual boxes, in a node; integrated circuits contained in the switching units; and programming that allows switching paths to be controlled. Note, the switching fabric can be distributed on the blades 402, 404, in a separate blade (not shown), or a combination thereof. The line blades 402 can include an Ethernet manager (i.e., a processor) and a Network Processor (NP)/Application Specific Integrated Circuit (ASIC).

The control blades 404 include a microprocessor 410, memory 412, software 414, and a network interface 416. Specifically, the microprocessor 410, the memory 412, and the software 414 can collectively control, configure, provision, monitor, etc. the network element 400. The network interface 416 may be utilized to communicate with an element manager, a network management system, etc. Additionally, the control blades 404 can include a database 420 that tracks and maintains provisioning, configuration, operational data and the like. The database 420 can include a forwarding database (FDB) that may be populated as described herein (e.g., via the user triggered approach or the asynchronous approach). In this exemplary embodiment, the network element 400 includes two control blades 404 which may operate in a redundant or protected configuration such as 1:1, 1+1, etc. In general, the control blades 404 maintain dynamic system information including packet forwarding databases, protocol state machines, and the operational status of the ports 408 within the network element 400.

Specifically, various components in the network element 400 can be configured to implement the various processes for the digital signature described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A digital signature method to represent network path trace information in a packet, implemented by a network element in a network, the digital signature method comprising:

receiving a unique identifier from one of a network controller, an element management system, and a network management system, wherein the unique identifier is resolved to be within a range of M, M being a number of network elements in the network;

updating a digital signature based on the unique identifier of the network element, wherein the digital signature is carried with the packet; and transmitting the packet by the network element with the updated digital signature, wherein the digital signature represents the network path trace information of the packet up to the network element, and the digital signature is a fixed size during traversal of the packet through the network, wherein the step of updating comprises performing a binary computation with a Cyclic Redundancy Check (CRC) of a bit field with the unique identifier included therein, and wherein the packet is one of
a Network Service Header (NSH), and
an Internet Protocol (IP) packet,
and the digital signature is carried in a field in the one of the NSH and the IP packet.

2. The digital signature method of claim 1, wherein the digital signature is a key carried in-band with the packet.

3. The digital signature method of claim 1, wherein the updated digital signature is carried in overhead of the packet.

4. The digital signature method of claim 1, wherein a network controller is configured to query the network element for the digital signature to verify a network path for the packet.

5. A digital signature apparatus configured to represent network path trace information in a packet, wherein the digital signature apparatus is within a network element in a network, the digital signature apparatus comprising:
   circuitry configured to receiving a unique identifier from one of a network controller, an element management system, and a network management system, wherein the unique identifier is resolved to be within a range of M, M being a number of network elements in the network;
   circuitry configured to update the digital signature based on a unique identifier of the network element, wherein the digital signature is carried with the packet; and
   circuitry configured to transmit the packet with the updated digital signature, wherein the digital signature represents the network path trace information of the packet up to the network element, and the digital signature is a fixed size during traversal of the packet through the network,
   wherein the circuitry configured to update is configured to perform a binary computation with a Cyclic Redundancy Check (CRC) of a bit field with the unique identifier included therein, and
   wherein the packet is one of
      a Network Service Header (NSH), and
      an Internet Protocol (IP) packet,
   and the digital signature is carried in a field in the one of the NSH and the IP packet.

6. The digital signature apparatus of claim 5, wherein the digital signature is a key carried in-band with the packet.

7. The digital signature apparatus of claim 5, wherein the updated digital signature is carried in overhead of the packet.

8. The digital signature apparatus of claim 5, wherein a network controller is configured to query the network element for the digital signature to verify a network path for the packet.

9. The digital signature apparatus of claim 5, wherein the packet comprises an Operations, Administration, and Maintenance (OAM) Protocol Data Unit (PDU) which is processed hop-by-hop in a bridged network.

10. A network element configured to represent network path trace information in a packet, the network element comprising:
    at least one port configured to transmit the packet; and
    a controller associated with or communicatively coupled to the at least one port, wherein the controller is configured to
    receive a unique identifier from one of a network controller, an element management system, and a network management system, wherein the unique identifier is resolved to be within a range of M, M being a number of network elements in the network,
    update a digital signature based on a unique identifier of the network element, wherein the digital signature is carried with the packet, and
    cause transmission of the packet with the updated digital signature, wherein the digital signature represents the network path trace information of the packet up to the network element, and the digital signature is a fixed size during traversal of the packet through the network,
    wherein the controller is further configured to performing a binary computation with a Cyclic Redundancy Check (CRC) of a bit field with the unique identifier included therein, and
    wherein the packet is one of
       a Network Service Header (NSH), and
       an Internet Protocol (IP) packet,
    and the digital signature is carried in a field in the one of the NSH and the IP packet.

11. The network element of claim 10, wherein the digital signature is a key carried in-band with the packet.

12. The network element of claim 10, wherein a network controller is configured to query the network element for the digital signature to verify a network path for the packet.

13. The network element of claim 10, wherein the controller is further configured to
    receive the unique identifier from a network controller prior to the circuitry configured to update the digital signature performing an update, wherein the unique identifier is resolved to be within a range of M, M being a longest interconnection sequence of network elements in the network.

14. The digital signature method of claim 1, wherein the fixed size is used to uniquely represent all permutations of a network path in the network.

* * * * *